Patented Aug. 22, 1944

2,356,466

UNITED STATES PATENT OFFICE 2,356,466

WATER-SOLUBLE RESINS

James G. McNally and Fred C. Duennebier, Rochester, N. Y., assignors to Eastman Kodak Company, Rochester, N. Y., a corporation of New Jersey No Drawing. Application January 12, 1942, Serial No. 426,496

6 Claims. (Cl. 260—45)

This invention relates to water-soluble resins and dye compositions containing said resins.

The invention has as an object the preparation of new and useful water-soluble resinous materials. A further object is to prepare a resinous material useful as a dispersing agent. Another object is to provide dye compositions containing a water-insoluble dye and the new water-soluble resin of our invention.

The water-soluble resins of our invention can be prepared by reacting a phenyl substituted urea with formaldehyde and then reacting the urea-formaldehyde product obtained with a phenol. In carrying out the condensation reactions above indicated, a non-volatile inorganic basic catalyst such as sodium carbonate, potassium carbonate, sodium hydroxide or potassium hydroxide should be present if the most satisfactory results are to be obtained. The phenyl substituted urea employed can be represented by the formula:

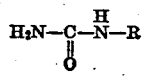

wherein R represents a phenyl nucleus which contains at least one water-solubilizing group such as a sulfonic acid group, a carboxylic acid group or a hydroxyl group.

Phenols that can be employed in preparing the water-soluble resins of our invention include phenol, 1,3-dihydroxybenzene, o-cresol, m-cresol, p-cresol, p-aminophenol, thymol, orcinol, 1,2,3-trihydroxybenzene and 1,3,5-trihydroxybenzene, for example. Normally, phenol is employed.

The water-soluble resins of our invention constitute valuable dispersing agents. They find particular application in the dispersion of dyes which are insoluble or relatively insoluble in water. Thus, the water-soluble resins of our invention can be used, for example, with the relatively insoluble dyes ordinarily used to color cellulose acetate textile materials. Illustrative of such dyes may be mentioned, 1,4-diaminoanthraquinone compounds such as 1-methylamino-4-ethylamino anthraquinone, 1-β-hydroxyethylamino-4 - β - hydroxyethylamino anthraquinone and 1-β-methoxyethylamino-4-ethylamino anthraquinone and azo compounds derived by coupling the diazonium compounds of aminobenzene compounds such as p-nitroaniline, p-aminoacetophenone, 1-amino-2-chloro-4-nitrobenzene and 1-amino-2,4-dinitro-6-chlorobenzene with coupling components such as N-ethylaniline, N-di-β-hydroxyethylaniline, N-ethyl, β-hydroxyethylaniline and N-di-β-hydroxyethyl-m-toluidine.

In employing the water-soluble resin compounds of our invention the aqueous reaction product obtained in the synthesis of the resin can be ground to a paste with the desired amount of the dye. The paste thus obtained may be used directly in the dye bath or it may be dried and then used. Similarly, if the resin has been dried, it can be dissolved in a small amount of water and then ground to a paste with the dye to be dispersed. The paste thus formed can be used, for example, as described above. If desired, both the resin and the dye can be ground together while in a dried condition although wet grinding appears to give more satisfactory results.

Various proportions of dye and water-soluble resin can be present in the dye compositions of our invention. Equal proportions by weight of dye and resin, for example, can be used although the amount of resin used can range say to four or five times that of the dye or it may be less than that of the dye. The proportions of dye and resin do not appear to be critical, except that sufficient of the resin should be present to effectively disperse the dye. Again excessive amounts of the resin are unnecessary.

The following examples illustrate the preparation of the new water-soluble resins and dye compositions of our invention.

*Example 1*

1 gram mole of potassium sulfophenyl urea is refluxed for two hours with 3 gram moles of aqueous formaldehyde (39%) in the presence of 4 grams of $Na_2CO_3$. 1 gram mole of phenol is then added to the reaction mixture and refluxing is continued for two to three hours. The resin formed can be recovered from the reaction mixture by evaporating the aqueous solution over a steam bath or by air drying on a drum drier.

The potassium salt of sulfophenyl urea used in the example can be prepared by reacting equal molecular quantities of sulfanilic acid and potassium cyanate. This reaction is described in Liebig's Annalen, Vol. 248, page 156 (1888).

*Example 2*

1 gram mole of dry sulfanilic acid is heated with 1 gram mole of urea at 115–120° C. for two hours. The sulfophenyl urea formed is neutralized with sodium hydroxide solution and 4 grams of $Na_2CO_3$ and 3 gram moles of formaldehyde (39%) are added and the solution refluxed for 2–3 hours. If technical sulfanilic acid has been used, it is advisable to filter the reaction mixture at this point. 1 gram mole of phenol is then added to the reaction mixture and refluxing is continued for 2 hours. Upon working up the reaction mixture, a water-soluble resin is obtained.

1 gram mole of p-cresol can be substituted for phenol in the above example to obtain a water-soluble resin of our invention.

Example 3

1 gram mole of sodium sulfanilate and 1 gram mole of urea are dissolved in 300 cc. of water and the solution is refluxed for 2-3 hours to form the sodium salt of sulfophenyl urea. 3.75 gram moles of formaldehyde (39%) and 4 grams of $Na_2CO_3$ are then added to the reaction mixture and refluxing is continued for another 2-3 hours. Following this, 1.75 gram moles of phenol are added to the reaction mixture and heating is continued for 2 hours. Upon working up the reaction mixture, a water-soluble resin is obtained.

Example 4

1 gram mole of p-aminophenol is heated with 1 gram mole of urea at 115-120° C. for 2 hours. The hydroxyphenol urea compound formed is neutralized with sodium hydroxide solution and then 4 grams of $Na_2CO_3$ and 3 gram moles of formaldehyde (39%) are added and the reaction mixture refluxed for 2-3 hours. Following this refluxing, 1 gram mole of phenol is added and the reaction mixture is refluxed an additional 2 hours. Upon working up the reaction mixture a water-soluble resin is obtained.

Example 5

1 gram mole of sodium anthranilate is refluxed with 1 gram mole of urea in the presence of 30 cc. of water for 2-3 hours to form the sodium salt of carboxyphenyl urea. 4 grams of $Na_2CO_3$ and 3 gram moles of formaldehyde (39%) are then added to the reaction mixture and refluxing is continued for 2-3 hours. Following this, 1 gram mole of phenol is added and the reaction mixture is refluxed an additional two hours. Upon evaporating the reaction mixture to dryness, a water soluble resin is obtained.

1 gram mole of 1,3-dihydroxybenzene can be substituted for phenol in the above example to obtain a water-soluble resin included within the scope of our invention.

Example 6

1 gram mole of aniline disulfonic acid is neutralized with an aqueous 15% NaOH solution and the resulting mixture is refluxed with 1 gram mole of urea for 2-3 hours. 4 gram moles of formaldehyde (39%) and 4 grams of $Na_2CO_3$ are then added to the reaction mixture and refluxing is continued for an additional 2 hours. Following this refluxing the desired resin product is formed by adding 2 gram moles of phenol to the reaction mixture and refluxing for another 1-2 hours. Upon evaporating the reaction mixture to dryness, a water-soluble resin is obtained.

Example 7

1 part by weight of any of the resins obtained in Examples 1-6 is dissolved in a small amount of water and ground to a paste with 1 part by weight of the water-insoluble dye to be dispersed. The paste may be used directly in the dyebath or it may be dried and then used when desired. Any of the water-insoluble dyes of the type referred to hereinbefore can be used in the production of this dye paste.

Example 8

The dye compositions of our invention can also be prepared by mixing the aqueous reaction product obtained in Examples 1-6 and grinding this to a paste with a suitable amount of a water-insoluble dye. When this procedure is followed, the aqueous reaction product can be first analyzed to determine the percentage of resin in the solution in order that the desired ratio of resin to dye in the finished paste can be obtained. As in Example 7 the paste obtained can be used directly in the dyebath or may be dried and then used.

It will be understood that the foregoing examples are intended to be illustrative and not limitative of our invention. Any of the non-volatile inorganic basic catalysts mentioned hereinbefore can be used in the condensation reactions in place of the sodium carbonate actually mentioned in the examples. Similarly, other phenols, in addition to those specifically mentioned in the examples, can be used to prepare water-soluble resins in accordance with the procedure which has been described in the examples.

We claim:

1. The water-soluble resin obtained by heating the reaction product of formaldehyde and a phenyl urea, the phenyl group of which contains a sulfonic acid group, with a phenol.

2. The water-soluble resin obtained by heating the reaction product of formaldehyde and a phenyl urea, the phenyl group of which contains a sulfonic acid group, with phenol.

3. The process of preparing a water-soluble resin which comprises heating formaldehyde and a phenyl urea, the phenyl group of which contains a sulfonic acid group, and then heating the reaction product obtained with a phenol, said reactions being carried out in the presence of a non-volatile inorganic base.

4. The process of preparing a water-soluble resin which comprises heating formaldehyde and a phenyl urea, the phenyl group of which contains a sulfonic acid group, and then heating the reaction product obtained with phenol, said reactions being carried out in the presence of a non-volatile inorganic base.

5. The process of preparing a water-soluble resin which comprises heating formaldehyde and a phenyl urea, the phenyl group of which contains a sulfonic acid group, and then heating the reaction product obtained with a phenol, said reactions being carried out in the presence of an alkali-metal carbonate.

6. The process of preparing a water-soluble resin which comprises heating formaldehyde and a phenyl urea, the phenyl group of which contains a sulfonic acid group, and then heating the reaction product obtained with phenol, said reactions being carried out in the presence of an alkali-metal carbonate.

JAMES G. McNALLY.
FRED C. DUENNEBIER.